United States Patent
Verstege et al.

(10) Patent No.: US 12,296,495 B2
(45) Date of Patent: May 13, 2025

(54) SMALL ELECTRICAL APPLIANCE WITH PROTECTIVE CIRCUIT

(71) Applicant: Braun GmbH, Kronberg (DE)

(72) Inventors: Thomas Verstege, Frankfurt AM (DE);
Frank Stefan Skopp, Eschborn (DE);
Marius Beat Hanner, Oberursel (DE);
Uwe Schober, Glashütten (DE)

(73) Assignee: Braun GMBH, Kronberg (DE)

( * ) Notice: Subject to any disclaimer, the term of this patent is extended or adjusted under 35 U.S.C. 154(b) by 492 days.

(21) Appl. No.: 17/196,008

(22) Filed: Mar. 9, 2021

(65) Prior Publication Data
US 2021/0276208 A1    Sep. 9, 2021

(30) Foreign Application Priority Data
Mar. 9, 2020   (EP) .................................... 20161838

(51) Int. Cl.
 B26B 19/38    (2006.01)
 A61C 17/22    (2006.01)
 B26B 19/28    (2006.01)

(52) U.S. Cl.
 CPC .......... *B26B 19/388* (2013.01); *A61C 17/221* (2013.01); *B26B 19/282* (2013.01)

(58) Field of Classification Search
 CPC .... B26B 19/388; B26B 19/282; A61C 17/221
 See application file for complete search history.

(56) References Cited

U.S. PATENT DOCUMENTS

| | | | |
|---|---|---|---|
| 6,819,083 B1 | 11/2004 | Patino et al. | |
| 9,124,118 B2 | 9/2015 | Klemm et al. | |
| 10,578,674 B2 * | 3/2020 | Heubach | H05B 1/0252 |
| 2009/0049694 A1 | 2/2009 | Morris | |
| 2012/0274257 A1 * | 11/2012 | Taylor | H02P 7/00 |
| | | | 318/473 |

(Continued)

FOREIGN PATENT DOCUMENTS

| CN | 107359681 A | 11/2017 |
|---|---|---|
| EP | 2993409 A1 | 3/2016 |

(Continued)

OTHER PUBLICATIONS

Extended European Search Report and Search Opinion; Application No. 20161838.6; dated Sep. 15, 2020; 8 pages.

*Primary Examiner* — Curtis A Kuntz
*Assistant Examiner* — James E Munion
(74) *Attorney, Agent, or Firm* — Andres E. Velarde; Gerd Zetterer

(57) ABSTRACT

The present invention relates to the field of small electrical appliances such as battery powered electrical appliances for personal hygiene, in particular to a hair removal device such as an electric shaver or epilator as well as an electric toothbrush. The small electrical appliance comprises an electric load, wherein the electric load heats up during operation; a measuring circuitry for measuring an electrical parameter of the electric load; a temperature sensor arranged spatially separated from the electric load; and control circuitry adapted to protect the electric load from overheating by controlling the electric load based on the electrical parameter of the electric load and an output of the temperature sensor.

19 Claims, 3 Drawing Sheets

(56) References Cited

U.S. PATENT DOCUMENTS

| | | | |
|---|---|---|---|
| 2016/0331497 A1 | 11/2016 | Follows et al. | |
| 2017/0020277 A1 | 1/2017 | Barnes et al. | |
| 2018/0203069 A1 | 7/2018 | Mori | |
| 2019/0358834 A1 * | 11/2019 | Anthony | B26B 19/388 |

FOREIGN PATENT DOCUMENTS

| | | | | |
|---|---|---|---|---|
| EP | 3546154 A1 | | 10/2019 | |
| JP | 2003014552 A | | 1/2003 | |
| JP | 2005354879 A | * | 12/2005 | |
| WO | WO-2015135682 A1 | * | 9/2015 | B26B 19/28 |

* cited by examiner

SMALL ELECTRICAL APPLIANCE WITH PROTECTIVE CIRCUIT

FIELD OF THE INVENTION

The present invention relates to the field of small electrical appliances such as battery powered electrical appliances for personal hygiene, in particular to a hair removal device such as an electric shaver or epilator as well as an electric toothbrush. The present invention furthermore relates to a protective circuit for a small electrical appliance and a corresponding method.

BACKGROUND OF THE INVENTION

Battery powered electrical appliances for personal hygiene such as electric shavers, epilators and electric toothbrushes are well known in the art.

An electric shaver, also known as dry razor, electric razor, or simply shaver, is a device with a rotating or oscillating blade or cutting unit. An electric shaver usually does not require the use of shaving cream, soap, or water. The razor may be powered by a small DC motor, which is either powered by batteries or mains electricity. Many modern ones are powered using rechargeable batteries. Alternatively, an electro-mechanical oscillator driven by an AC-energized solenoid may be used.

An epilator is an electrical device used to remove hair by mechanically grasping multiple hairs simultaneously and pulling them out. The way in which epilators pull out hair is similar to waxing, although unlike waxing, they typically do not remove cells from the epithelium of the epidermis. Aside from the spring in early spring-type epilators, there are no parts in epilators that require regular replacement. Epilators come in corded, rechargeable and battery-operated designs.

An exemplary electric shaver is disclosed in EP 3 546 154 A1.

SUMMARY OF THE INVENTION

It is an object of the present invention to provide a further improved small electrical appliance such as a battery powered electrical appliance for personal hygiene, in particular to provide a further improved hair removal device such as an electric shaver or epilator or an electric toothbrush.

In particular, it would be advantageous to maintain or improve device reliability while at the same time reducing manufacturing costs. In addition or in the alternative, it would be desirable that the device does not unnecessarily early enter a thermal protection state to prevent overheating.

In a first aspect of the present invention, a small electrical appliance, in particular a hair removal device or toothbrush is presented. The small electrical appliance comprises
   an electric load, wherein the electric load heats up during operation;
   a measuring circuitry for measuring an electrical parameter of the electric load;
   a temperature sensor arranged spatially separated from the electric load; and
   control circuitry adapted to protect the electric load from overheating by controlling the electric load based on the electrical parameter of the electric load and an output of the temperature sensor.

In a further aspect of the present invention a method for protecting an electric load of a small electrical appliance, in particular of a hair removal device or toothbrush, from overheating, wherein the electric load heats up during operation of the small electrical appliance, is presented. The method comprises measuring an electrical parameter of the electric load; measuring a temperature with a temperature sensor arranged spatially separated from the electric load; and controlling the electric load so as to protect the electric load from overheating based on the electrical parameter of the electric load and an output of the temperature sensor.

In yet further aspects of the present invention, there are provided a corresponding computer program which comprises program code means for causing a computer to perform the steps of the control circuitry or control method disclosed herein when said computer program is carried out on a computer as well as a non-transitory computer-readable storage medium that stores therein a computer program product, which, when executed by a processor, causes the control method disclosed herein to be performed.

Preferred embodiments of the invention are defined in the dependent claims. It shall be understood that the claimed method, computer program and medium can have similar and/or identical preferred embodiments as the claimed appliance, in particular as defined in the dependent claims and as disclosed herein.

The inventors recognized that, in particular for hair removal devices such as electric shavers, it may be possible to use cost-saving linear motors. However, even though such motors can provide very good hair-cutting performance at an attractive price, a drawback of such motors is that they may suffer from thermal damage. In contrast to conventional rotational motors wherein a winding resistance may be used to sense a temperature directly within the motor, this may not be possible with a low-complexity linear motor. The inventors recognized that there may be scenarios where there may be no possibility to measure a temperature of the electric load such as a motor temperature with a sensor within the load or indirectly e.g. with a coil resistance during operation of the motor.

In particular when using a linear motor with one or more plastic springs, the motor temperature should not exceed a predetermined temperatures threshold of e.g. 60 or 80° C. since the material may be weakened which may result in a reduced or even collapsed air gap between coil and magnets. This may result in the motor not running with the correct amplitude, increased running noise or even in the destruction of the motor as the electric load.

Moreover, the inventors recognized that by providing the temperature sensor separate from the electric load the design flexibility may be further improved. For example there may be no need to provide additional wiring for a temperatures sensor within the electric load. For example, if an electric shaver motor is arranged in a shaver head, the electric wiring effort between the shaver head and a main shaver body where power supply and control electronics are arranged may be reduced.

Further, the inventors recognized that simply providing a temperature sensor spatially separate from the electric load may require rather large safety margins for thermal shutdown since there may be insufficient thermal coupling to allow the spatially separated temperature sensor to provide a valid indication of the actual temperature of the electric load that heats up during operation.

It is thus suggested to provide an electrical appliance, in particular a hair removal device or toothbrush, wherein a temperature sensor arranged spatially separated from the electric load is provided and further a measuring circuitry for measuring an electrical parameter of the electric load. The control circuitry is adapted to determine an overheat condition based on not only on the output of the temperature but based on the combination of the electrical parameter of the electric load and the output of the temperature sensor. Accordingly, the control circuitry is adapted to protect the electric load from overheating by controlling, e.g. shutting down the electric load based on the electrical parameter of the electric load and the output of the temperature sensor. Thereby, even though the temperature sensor due to the spatial separation from the load does not provide an immediate temperature value of the electric load, a thermal condition of the electric load can be estimated or modelled so as to provide thermal protection of the electric load. The proposed solution may also provide advantages regarding system design since the temperature sensor may be more flexibly arranged in the appliance, for example on a PCB together with the control circuitry which may reduce the manufacturing effort and cost.

In the following, some terms which are used throughout the application, shall be shortly explained and defined:

As used herein, a small electric appliance or electric appliance may refer to an electric appliance for personal use such as e.g. a hair removal device or toothbrush but may also refer to an electronic device such as a smartphone, tablet, or laptop. In particular, a small electric appliance may refer to a hand-held electronic device.

As used herein, a computer may refer to a device adapted to execute machine readable instructions, including but not limited to a microcontroller (µC), ASIC, FPGA, microprocessor or a general purpose computer.

As used herein, control circuitry may be implemented by discrete electronic circuit elements but may also be implemented using integrated circuitry such as e.g. a microcontroller, ASIC, FPGA and the like. The control circuitry may be implemented using a combination of hardware and software adapted to operate said hardware to function as the control circuitry.

As used herein the term "spatially separated" denotes that the temperature sensor is not part of the electric load or arranged within the electric load. For example, the temperature sensor may be arranged on a printed circuit board, optionally with further circuit elements, other than the electric load. The temperature sensor may be arranged on a printed circuit board other than a printed circuit board of the electric load. Spatially separated can denote that the temperature sensor and the electric load are separated by a distance of at least 2 mm, in particular of at least 5 mm, in particular of at least 7.5 mm, in particular of at least 10 mm, in particular of at least 15 mm, in particular of at least 20 mm, in particular of at least 30 or 40 mm Spatially separated can denote that the temperature sensor and the electric load may not be connected to each other via a thermal coupling element optimized for heat transfer but may be connected to each other via a thermal insulator. It should be noted that the term spatially separated does not exclude that the electric load and temperature sensor may be arranged within the same housing, for example inside the housing of an electric shaver or toothbrush.

In an embodiment, the small electrical appliance may be a hair removal device or an electric toothbrush. The small electrical appliance may be a battery powered electrical appliance for personal hygiene which may be a hair removal device, in particular a shaver or epilator, or an electric toothbrush or a massage device. Generally speaking, the electrical appliance for personal hygiene may comprise an electric motor, a heating element or a light source, e.g. in a light based hair removal device, as the electric load.

The temperature sensor and the control circuitry can be arranged on a printed circuit board (PCB) spatially separated from the electric load. In particular, the electric load to be protected is preferably arranged on the same PCB as temperature sensor and control circuitry. This enables a more flexible system design. It shall be understood that an electrical connection such as power supply wiring may nevertheless be provided between the electric load and the control circuitry.

In an embodiment, the small electrical appliance may be a shaver, wherein the electric load is an electric shaver motor and wherein the electric shaver motor is arranged in a shaver-head of the shaver and wherein the temperature sensor and control circuitry are arranged in a shaver-body of the shaver. The shaver body can also be referred to as shaver handle. An advantage of arranging the temperature sensor together with the control circuitry in the shaver body rather than providing a temperature sensor in the shaver head can be a reduced wiring effort which may also improve device reliability. Alternatively, the shaver motor can also be arranged in the shaver body. In this case a drive train can be provided between the shaver body and the shaver head such that the shaver motor in the shaver body can drive a hair cutting unit in the shaver head. The temperature sensor can be conveniently arranged on a PCB in the shaver body separate from the shaver motor and does not have to be part of the shaver motor or directly attached thereto.

In more detail, the small electrical appliance can be shaver comprising a shaver body and a shaver head, in particular wherein the shaver head is pivotably mounted relative to shaver body, wherein the shaver head is provided with at least one hair cutting unit, wherein the electric load is an electric shaver motor for driving the hair cutting unit; wherein the temperature sensor and control circuitry are arranged in the shaver-body of the shaver and wherein the electric shaver motor is arranged in the shaver-head or shaver-body of the shaver. The shaver body can be provided with an internal chassis part holding a printed circuit board and a battery. The temperature sensor and/or control circuitry can be arranged on said printed circuit board.

As indicated above, the electric load can be an electric motor. In particular, the electric load can be a linear electric motor. The linear electric motor can comprise one or more plastic springs. The plastic springs can be adapted to exert a restoring force, i.e. a restoring force regarding the movable part of the linear electric motor. The movable part may also be referred as rotor similar to a rotatory electric motor.

In addition or in the alternative, the electric load may comprise a battery or battery cell. For example during a charging process, the battery may form the electric load of the small electrical appliance. The electric load can refer to a device that is adapted to consume a power of at least 10%, in particular at least 25%, in particular at least 50% of a maximum power consumption of the small electrical appliance during operation. Operation of the device may also include a charging process.

The electrical parameter may comprise at least one of an electrical current or an electrical power intake. The electrical current or electrical power intake provide an indication of the physical work performed by the electric load. Depending on the efficiency of the electric load, only a certain portion of the power is converted e.g. into a movement whereas the remainder leads to heating of the electric load and thus increases the temperature of the electric load. The temperature sensor, which is arranged spatially separated from the load, may provide an indication of the overall device or ambient temperature. By further considering the heating effect which can be derived from the electrical parameter, the actual temperature of the electric load can be estimated and used to protect the load from overheating—even though no temperature sensor may be provided directly at or in the electric load.

The control circuitry can be adapted to determine an ambient temperature based on the output of the temperature sensor. The control circuitry can be adapted to protect the electric load from overheating by controlling the electric load based on the ambient temperature and the electrical parameter of the electric load. Hence, as indicated above, the temperature sensor may provide an ambient temperature rather than temperature of electric load. For example, the control circuitry may be adapted to determine said ambient temperature before heating up of the electric load, e.g. before operating. Hence, a base temperature without heating effects from the load can be determined.

The temperature sensor can be arranged inside a housing of the small electrical appliance. The control circuitry can be adapted to model the ambient temperature based on a previous operation of the small electrical appliance, an elapsed time since said previous operation and an output of the temperature sensor. The control circuitry can be adapted to determine an elapsed time interval with respect to a previous operation of the electric load and/or a previous output of the temperature sensor; and the control circuitry can be adapted to protect the electric load from overheating by controlling the electric load based on the electrical parameter of the electric load, the output of the temperature sensor and further based on said elapsed time interval. In addition or in the alternative, if the small electrical appliance is a battery powered electrical appliance, the elapsed time interval can be an elapsed time interval with respect to a previous charge operation. The inventors recognized that if the device was recently operated or charged, the temperature measurement provided by the temperature sensor within the housing may not correctly reflect an ambient temperature. Hence, a heating effect of a previous operation or charging may be taken into consideration when determining a temperature measurement with the temperature sensor. If the appliance is used several times in a row, the temperature sensor may not be completely isolated from thermal impact due to the electric load or a battery, such that the temperature sensor might provide erroneous readings of the ambient temperature. Hence, it is suggested to also consider a cooling-off period of the electric load that may heat up during operation.

In a refinement, if the elapsed time interval is below a predetermined threshold, the control circuitry can be adapted to control the electric load based on a previous output of the temperature sensor prior to said elapsed time interval. An advantage of this approach is a very cost-effective implementation. For example, no complex calculations regarding a cooling-off behavior and temperature distribution may be required. Instead, a previous output of the temperature sensor is used. For example, time stamps of switching-on times may be compared. Hence, a simple off-the-shelf microcontroller with very limited memory may be sufficient for performing the control operation. The inventors recognized that for the specific use case of small electrical appliances such as hair removal devices or toothbrushes, the device is typically used in a rather stable environment such that the proposed assumption may be applied. For example, a bath room may be a similar temperature every morning and/or may not significantly change between uses of the appliances such that a previous temperature measurement provides a valid estimate of the ambient temperature.

In an embodiment, the control circuitry can be adapted to protect the electric load from overheating by controlling the electric load based on a thermal model of the electric load. An advantage of this embodiment can be that the device reliability and availability may be further improved since the probability of a premature thermal shutdown may be reduced.

In a refinement, the electrical load can be an electric motor and the thermal model can comprise determining heating of the electric motor based on an average pulse current during operation of the electric motor and/or at least one of a pulse peak current or a pulse current at a middle of a motor pulse. Thereby a good estimation of the thermal heating of the electric motor can be obtained. In particular a motor current can be measured at two points, namely (1) at the middle of a current pulse and (2) a pulse peak motor current preferably together with timestamps of said points. With the measured motor current at the middle of the pulse and at the end or peak of the pulse the power consumption of the motor can be estimated. The power consumption in turn correlates with the heating of the electric motor such that a heating of the electric motor can be determined based on said motor current measurements.

The thermal model can comprise estimating a temperature of the electric load based on (1) a first sub-model indicative of the ambient temperature, (2) a second sub-model indicative of a power dissipation of the electric load, and (3) a third sub-model indicative of a temperature of the electric load at said ambient temperature and said power dissipation. As described above, the second sub-model can be based on the average pulse current during operation of the electric motor and at least one of a pulse peak current or a further pulse current at a middle of a motor pulse. In a refinement, said third sub-model can comprise determining a starting temperature of the electric load at beginning of operation, wherein said starting temperature is determined based on the ambient temperature, an elapsed time since a previous operation of the load and a current output of the temperature sensor. The third-sub-model can comprise a model of a cooling off behavior of the electric load. The proposed solution can thereby enable advantageous thermal protection of the electric load of the small electrical appliance even in cases where a direct temperature measurement of the electric load is not possible or not desirable. Moreover, as described the design flexibility may be further improved since the temperature sensor may be positioned rather flexibly at different locations.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
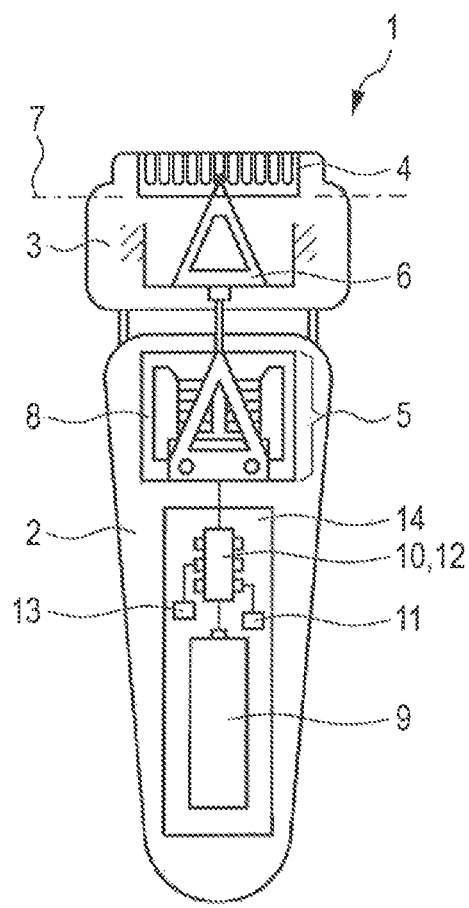
FIG. 1 shows a schematic diagram of a first embodiment of a small electrical appliance in form of an electric shaver.

FIG. 1 schematically shows a first embodiment of a battery powered electrical appliance for personal hygiene in form of an electric shaver. The appliance is therein denoted in its entirety by reference numeral 1. The shaver comprises a shaver body or main body 2 and a shaver head 3 as generally known in the art. The shaver head 3 comprises a cutter 4 with one or more razor blades. The cutter 4 is set in motion by an electric motor 5 that can be arranged within the main body 2 or within the shaver head 3. In the given embodiment the electric motor 5 is the electric load of the small electrical appliance 1 that heats up during operation. The electric motor 5 is connected to the cutter 4 via a drive train 6. The cutter 4 can move along a swivel axis 7. The shaver head 3 may, to a certain extent, be movable with respect to the shaver body 2 such that the shaver head can adapt to a contour of a user's face.

In the shown embodiment, the electric motor 5 is a linear electric motor. The electric motor 5 comprises one or more plastic springs 8 that can exert a restoring force on the movable portion (similar to the rotor of a rotatory electric motor) of the linear electric motor. This embodiment can provide very good hair-cutting performance at an attractive price. However, when using a linear motor with one or more plastic springs, the motor temperature should not exceed a predetermined temperatures threshold of e.g. 60 or 80° C. since the material may be weakened which may result in a reduced or even collapsed air gap between coil and magnets. This may result in the motor not running with the correct amplitude, increased running noise or even in the destruction of the motor as the electric load.

A battery 9, in particular a lithium-ion battery that can be arranged within the main body 2 may serve as the energy source to power the small electrical appliance 1.

The small electrical appliance 1 further comprises measuring circuitry 10, for measuring an electrical parameter of the electric load 5; a temperature sensor 11 arranged spatially separated from the electric load 5; and control circuitry 12 adapted to protect the electric load 5 from overheating by controlling the electric load based on the electrical parameter of the electric load and an output of the temperature sensor 11. In the example shown in FIG. 1, the control circuitry 12 and the measuring circuitry 10 are provided as a combined element for example in form of a microcontroller that is adapted to perform the respective functionality. However, it shall be understood that the control circuitry 12 and measuring circuitry 10 may also be provided as separate elements. For example, the measuring circuitry may comprise a shunt resistor (not shown) in a power supply line to the electric load 5 over which a voltage drop is measured to determine said electrical parameter of the electric load. A memory 13 can be provided to store a previously measured temperature value from the temperature sensor 11.

The shaver body 2 can be provided with an internal chassis part wherein a printed circuit board, PCB, 14 is arranged. The PCB 14 may hold one or more of the measuring circuitry 10, the temperature sensor 11, the control circuitry 12, and/or the memory 13. The memory can also be part of the control circuitry 12, for example a memory of a microcontroller.

Figure 2:
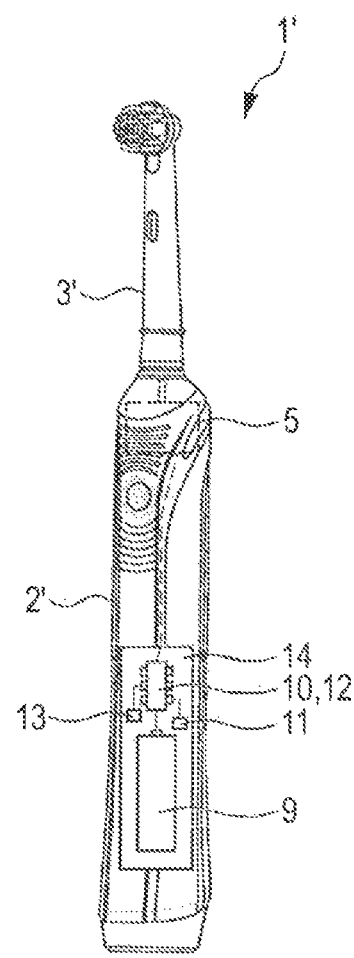
FIG. 2 shows a schematic diagram of a second embodiment of a small electrical appliance in form of a toothbrush.

Accordingly, FIG. 2 shows a further embodiment of a battery powered electrical appliance 1 for personal hygiene in form of an electric toothbrush 1'. Further embodiments of a small electrical appliance can refer to other embodiments of a battery powered electrical appliance for personal hygiene such as other forms of hair removal devices, such as epilators or light pulse based hair removal devices, or massage devices. The toothbrush 1' comprises a main body 2' and a toothbrush head 3'. The toothbrush is driven by an electric motor as the electric load 5.

Figure 3:
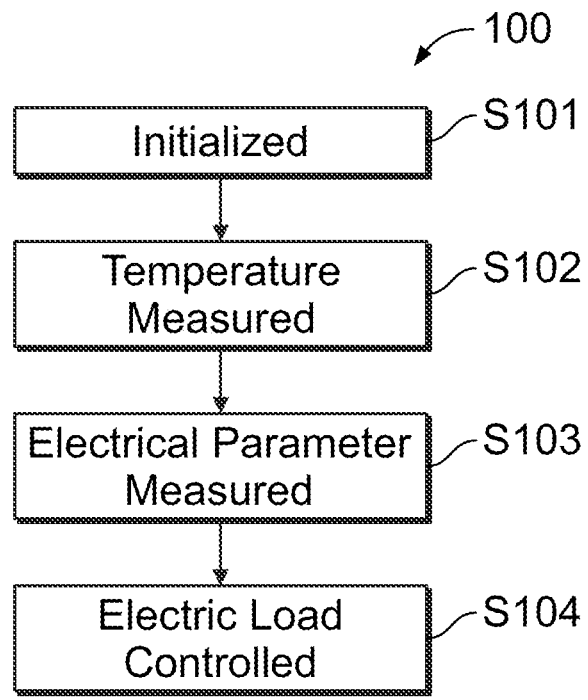
FIG. 3 shows a flow chart of a method according to an aspect of the present disclosure.

FIG. 3 shows a flow chart of a method protecting an electric load (5) of a small electrical appliance (1, 1'), in particular of a hair removal device (1) or toothbrush (1') as for example shown in FIGS. 1 and 2, from overheating, wherein the electric load heats up during operation of the small electrical appliance. In first step S101, the method is initialized. In step S102 a temperature is measured with a temperature sensor (11) that is arranged spatially separated from the electric load. In step S103 an electrical parameter of the electric load (5) can be measured. In step S104 the electric load is controlled so as to protect the electric load from overheating based on the electrical parameter of the electric load and an output of the temperature sensor. For example, the electric load may be switched off or may not even be activated in first place if an overheating condition is determined.

It should be noted that steps S102 and S103 may also be performed in parallel or in reverse sequence. An advantage of reversing the sequence is that the temperature measurement with the temperature sensor arranged spatially separated from the load can be performed prior to activating the electric load. Thereby, an undesirable contribution from the electric load can be prevented. Assuming that the small electric appliance is in thermal equilibrium with its surroundings, even if the temperature sensor is arranged inside a housing of the small electrical appliance, the temperature sensor provides an estimate of the ambient temperature.

Figure 4:
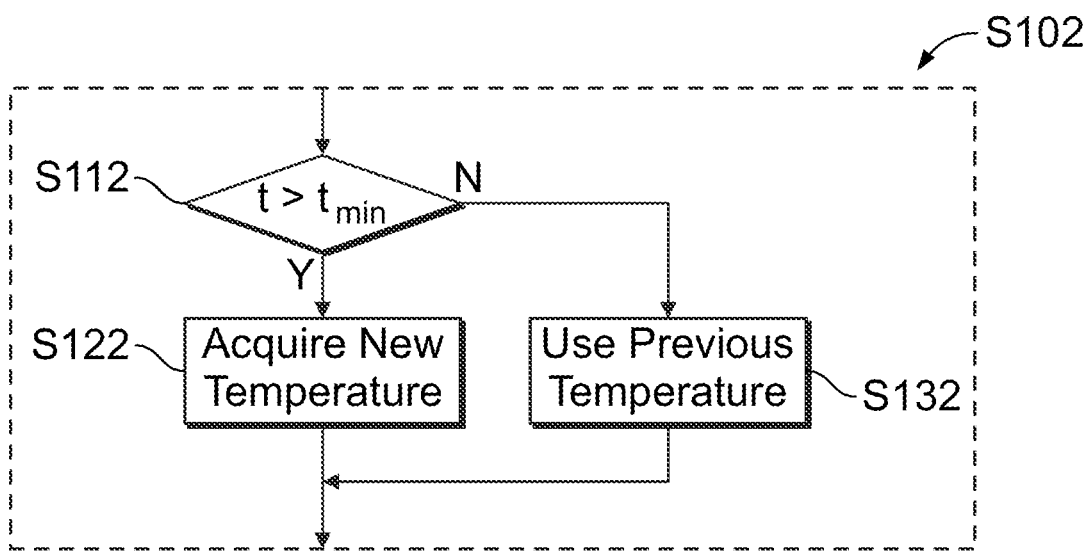
FIG. 4 shows a further refinement of a method step of the flow chart of FIG. 3

FIG. 4 shows an optional refinement of method step S102. In an optional step S112, the control circuitry may check whether an elapsed time interval t with respect to a previous operation of the electric load is above or below a predetermined time threshold $t_{min}$. If the elapsed time interval t is above (or equal to) said threshold, the method may proceed to step S122 and acquire a new temperature measurement with the temperature sensor. However if the elapsed time interval is below said threshold, the method may proceed to step S132 and a previous output of the temperature sensor prior to said elapsed time interval may be used. This optional refinement allows to avoid or at least reduce an impact of heat sources within the small electric appliance on an estimate of the ambient temperature based on the measurement with the temperature sensor inside the appliance. The elapsed time basically ensures a sufficient cooling-off period before using a new measurement using the temperature sensor arranged inside a housing of the small electrical appliance.

Figure 5:
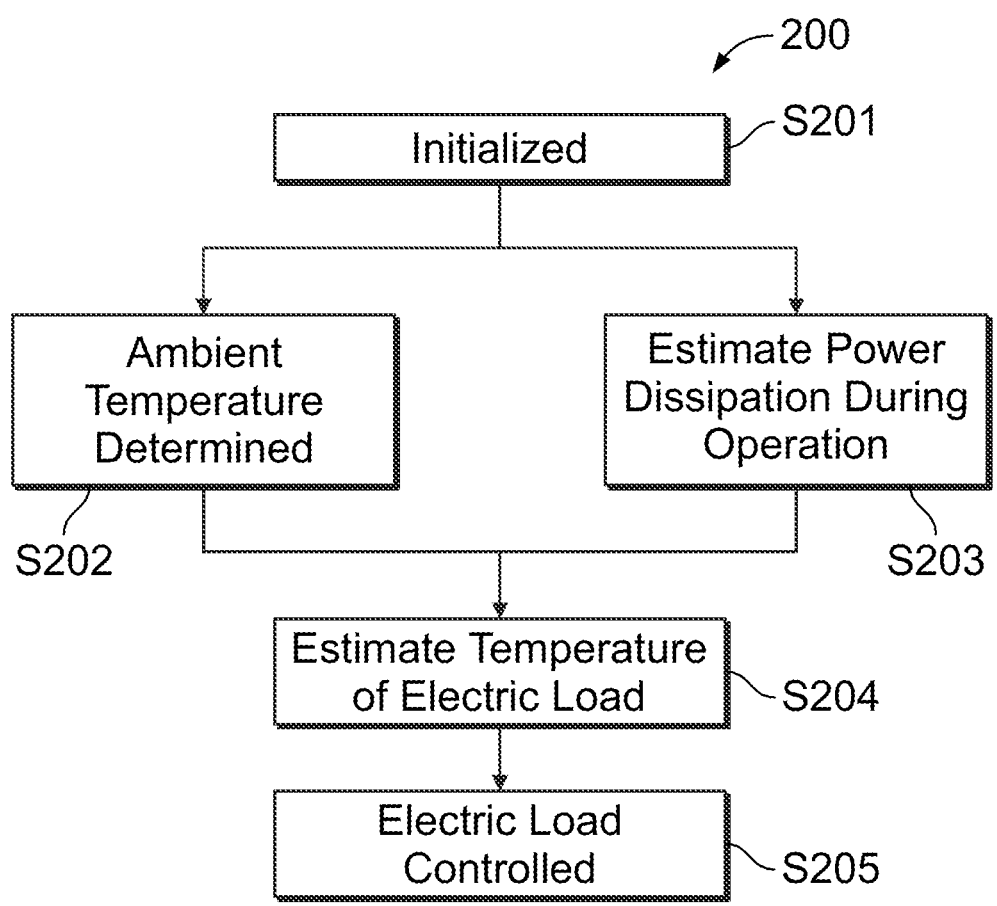
FIG. 5 shows a flow chart of a method according to a further aspect of the present disclosure.

FIG. 5 shows a flow chart 200 of one more method steps that may be performed by the control circuitry 12. The control circuitry 12 can be adapted to protect the electric load 5 from overheating by controlling the electric load 5 based on a thermal model of the electric load. The thermal model may comprise several sub-models. For example, the thermal model may comprise estimating a temperature of the electric load, such as a coil temperature, based on a first sub-model indicative of the ambient temperature, a second sub-model indicative of a power dissipation or heating of the electric load (5), and a third sub-model indicative of a temperature of the electric load (5) at said ambient temperature and said power dissipation. In step S201 the method is initialized.

In step S202, referring to the first sub-model, an ambient temperature may be determined based on an output of the temperature sensor inside the housing of the electrical appliance. Optionally, the approach as described in FIG. 4 may also be used. The control unit may be adapted to estimate the ambient temperature and/or a temperature of the electric load before its operation, e.g. before motor startup, based on the measurement of the temperature sensor arranged spatially separate from the electric load. This may also be referred to as a PCB temperature. The determination may optionally comprise assumptions about a change of the external temperature, charging of the device and/or a time interval since last operation of the electric load (cf. also FIG. 4). An estimate of the ambient temperature can be provided as the output of step S202.

In step S203, referring to the second sub-model, a power dissipation or (mean) power during operation of the electric load may be estimated. For example, the power dissipation can be estimated as described above based on a current (1) at the middle of a current pulse and (2) a pulse peak current preferably together with timestamps of said points. With the measured current at the middle of the pulse and at the end or peak of the pulse the power consumption of the electric load can be estimated. The power consumption in turn correlates with the heating of the electric load such that a heating of the electric load can be determined based on said current measurements.

In step S204, referring the third sub-model, a temperature of the electric load (5) may be estimated based on the outputs of steps S202 and S203, i.e., said ambient temperature and said power dissipation. For example, in case of the electric load being a (linear) electric motor, a motor coil temperature may be estimated. It should be noted that steps S202, S203 and S204 may be repeatedly be performed, for example at a predetermined frequency. Hence, the coil temperature may be estimated based on an estimation of the ambient temperature of step S202 and a thermal model that further takes the heating of the electric load based on the power consumption into consideration.

In step S205, if the estimated temperature of the electric load as an output of step S204 exceeds a predetermined temperature threshold, the electric load is controlled so as to protect the electric load from overheating. For example if the temperature of the electric load exceeds a thermal shut off temperature level the electric load can be switched off by the control circuitry. Optionally, before the electric load may be used again, for example before a motor of the small electrical appliance may be restarted, the control circuitry may recalculate the estimate of the electric load. If the estimated temperature of the electric load is below a predetermined temperature threshold again, the control circuitry may resume operation of the electric load.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

It shall be understood that that the functions performed by the control device may be more generally performed by the battery powered electrical appliance for personal hygiene. Hence, instead of a control device adapted to cause the battery powered electrical appliance for personal hygiene to perform a certain function, reference can also be made to the battery powered electrical appliance for personal hygiene adapted to perform a certain function. The control device may be implemented by one or more entities. In an advantageous embodiment, the control device can be implemented by circuitry comprising a microcontroller.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. Small electrical appliance comprising a hair removal device or a toothbrush, comprising:
   an electric load, wherein the electric load heats up during operation;
   a measuring circuitry for measuring an electrical parameter of the electric load;
   a temperature sensor arranged spatially separated from the electric load; and
   control circuitry adapted to protect the electric load from overheating by controlling the electric load based on the electrical parameter of the electric load and an output of the temperature sensor, wherein a temperature of the electric load is estimated using the output from the temperature sensor comprising an ambient base temperature and a heating effect derived from the electrical parameter.

2. Small electrical appliance as claimed in claim 1, wherein the temperature sensor and the control circuitry are arranged on a printed circuit board spatially separated from the electric load.

3. Small electrical appliance as claimed in claim 1, wherein the small electrical appliance is a shaver comprising a shaver body and a shaver head, wherein the shaver head is pivotably mounted relative to the shaver body, wherein the shaver head is provided with at least one hair cutting unit, wherein the electric load is an electric shaver motor for driving the hair cutting unit: wherein the temperature sensor and the control circuitry are arranged in the shaver-body of the shaver and wherein the electric shaver motor is arranged in the shaver-head or shaver-body of the shaver.

4. Small electrical appliance as claimed in claim 1, wherein the electric load is a linear electric motor with one or more plastic springs adapted to exert a restoring force.

5. Small electrical appliance as claimed in claim 1, wherein the electrical parameter comprises at least one of an electrical current or an electrical power intake.

6. Small electrical appliance as claimed in claim 1, wherein the control circuitry is adapted to determine the ambient base temperature based on the output of the temperature sensor; and wherein the control circuitry is adapted to protect the electric load from overheating by controlling the electric load based on the ambient base temperature and the heating effect derived from the electrical parameter of the electric load.

7. Small electrical appliance as claimed in claim 6, wherein the temperature sensor is arranged inside a housing of the small electrical appliance and wherein the control circuitry is adapted to model the ambient base temperature based on a previous operation of the small electrical appliance, an elapsed time since said previous operation and an output of the temperature sensor.

8. Small electrical appliance as claimed in claim 6, wherein the control circuitry is adapted to determine an elapsed time interval with respect to a previous operation of the electric load and/or a previous output of the temperature sensor; and wherein the control circuitry is adapted to protect the electric load from overheating by controlling the electric load based on the heating effect derived from the electrical parameter of the electric load, the output of the temperature sensor and further based on said elapsed time interval.

9. Small electrical appliance as claimed in claim 8, wherein if the elapsed time interval is below a predetermined threshold, the control circuitry is to control the electric load based on a previous output of the temperature sensor prior to said elapsed time interval.

10. Small electrical appliance as claimed in claim 1, wherein the control circuitry is adapted to protect the electric load from overheating by controlling the electric load based on a thermal model of the electric load.

11. Small electrical appliance as claimed in claim 10, wherein the electrical load is an electric motor and wherein the thermal model comprises determining heating of the electric motor based on an average pulse current during operation of the electric motor and at least one of a pulse peak current or a further pulse current at a middle of a motor pulse.

12. Small electrical appliance comprising a hair removal device or a toothbrush, comprising:
an electric load, wherein the electric load heats up during operation;
a measuring circuitry for measuring an electrical parameter of the electric load;
a temperature sensor arranged spatially separated from the electric load; and
control circuitry adapted to protect the electric load from overheating by controlling the electric load based on the electrical parameter of the electric load and an output of the temperature sensor, the control circuitry is adapted to protect the electric load from overheating by controlling the electric load based on a thermal model of the electric load, wherein the thermal model comprises estimating a temperature of the electric load based on a first sub-model indicative of the ambient temperature, a second sub-model indicative of a power dissipation of the electric load, and a third sub-model indicative of a temperature of the electric load at said ambient temperature and said power dissipation.

13. Small electrical appliance as claimed in claim 12, wherein said third sub-model comprises determining a starting temperature of the electric load at beginning of operation, wherein said starting temperature is determined based on the ambient temperature, an elapsed time since a previous operation of the electric load and a current output of the temperature sensor; and wherein said third-sub-model comprises a model of a cooling off behavior of the electric load.

14. Method for protecting an electric load of a small electrical appliance comprising a hair removal device or a toothbrush, from overheating, wherein the electric load heats up during operation of the small electrical appliance, the method comprising
measuring an electrical parameter of the electric load;
measuring a temperature with a temperature sensor arranged spatially separated from the electric load; and
controlling the electric load so as to protect the electric load from overheating based on the electrical parameter of the electric load and an output of the temperature sensor, wherein a temperature of the electric load is estimated using the output from the temperature sensor comprising an ambient base temperature and a heating effect derived from the electrical parameter.

15. Small electrical appliance as claimed in claim 1, wherein the electric load comprises a linear motor.

16. Method for protecting an electric load of a small electrical appliance as claimed in claim 14, wherein the electric load comprises a linear motor.

17. Small electrical appliance comprising a hair removal device or a toothbrush, comprising:
an electric load, wherein the electric load heats up during operation;
a measuring circuitry for measuring an electrical parameter of the electric load;
a temperature sensor arranged spatially separated from the electric load; and
control circuitry adapted to protect the electric load from overheating by controlling the electric load based on a power dissipation of the electric load estimated from the electrical parameter of the electric load and an output of the temperature sensor, wherein a temperature of the electric load is estimated using the output from the temperature sensor comprising an ambient base temperature and a heating effect derived from the power dissipation of the electric load.

18. Small electrical appliance as claimed in claim 1, wherein the heating effect is derived from the electrical parameter based on an average pulse current during operation of the electric motor and/or at least one of a pulse peak current or a further pulse current at a middle of a motor pulse.

19. Small electrical appliance as claimed in claim 1, wherein the heating effect is derived from a power dissipation of the electric load estimated from the electrical parameter of the electric load.

* * * * *